April 8, 1941.                R. W. POINTER                 2,238,002
                       CUSHION SEAT FOR TRAILER AXLES
                           Filed Oct. 3, 1938           2 Sheets-Sheet 1

INVENTOR
ROBERT W. POINTER
BY
ATTORNEY

April 8, 1941.  R. W. POINTER  2,238,002
CUSHION SEAT FOR TRAILER AXLES
Filed Oct. 3, 1938  2 Sheets-Sheet 2
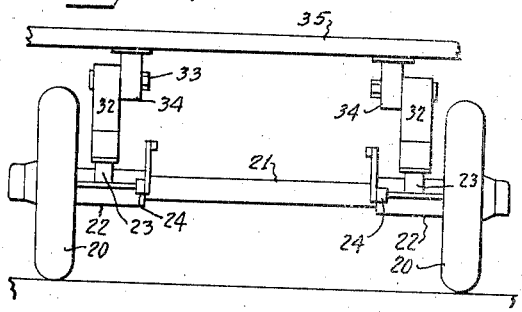
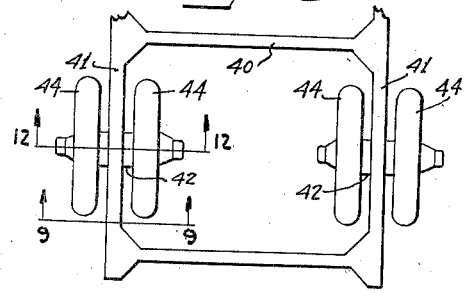
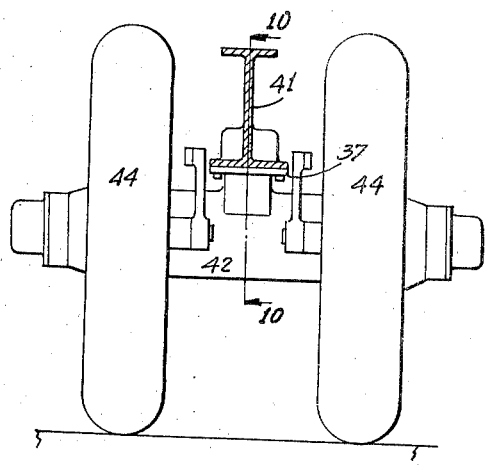
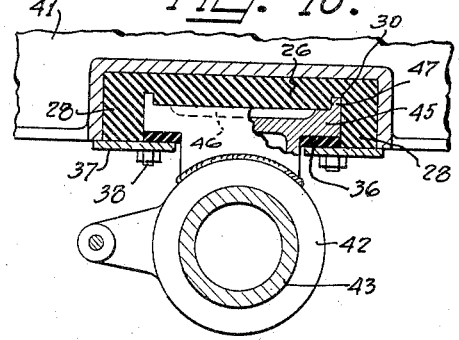
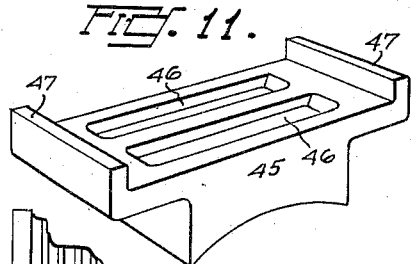
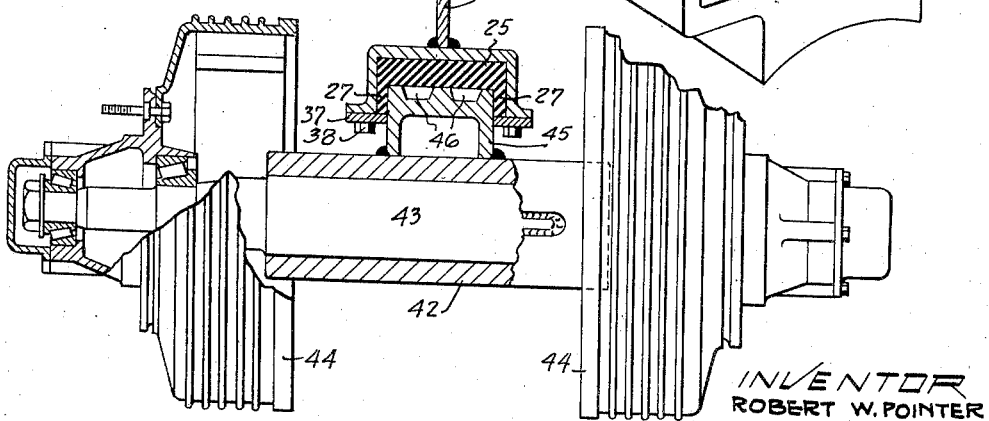
INVENTOR
ROBERT W. POINTER
BY
ATTORNEY Patented Apr. 8, 1941

2,238,002

UNITED STATES PATENT OFFICE 2,238,002

CUSHION SEAT FOR TRAILER AXLES

Robert W. Pointer, Portland, Oreg., assignor of one-half to Willamette Iron & Steel Corporation, Portland, Oreg., a corporation of Oregon Application October 3, 1938, Serial No. 232,956

2 Claims. (Cl. 280—81)

This invention relates generally to land travelling vehicles, and particularly to a cushion seat for trailer axles.

The main object of this invention is to construct a resilient seat for a trailer axle whereby the chassis of the vehicle and the load supporting frame may adapt themselves to the various conditions of the roadway without imparting undue stresses upon the various elements of the chassis or load supporting frame.

The second object is to construct a cushion seat for a trailer axle which will absorb vibrations from the chassis before they are conducted to the load supporting portion of the trailer.

The third object is to construct a device of the class described which will be simple to manufacture, of a relatively low cost and of long life.

I accomplish these and other objects in the manner set forth in the following specification as illustrated in the accompanying drawings, in which:

Fig. 7 is an elevation of the form of the device shown in Fig. 1.

Fig. 8 is a plan of a modified form of the device.

Fig. 9 is a section taken along the line 9—9 in Fig. 8.

Fig. 10 is a section taken along the line 10—10 in Fig. 9.

Fig. 11 is a perspective view of a modified form of cushion table.

Fig. 12 is a section taken along the line 12—12 in Fig. 8.

Similar numerals refer to similar parts throughout the several views.

Figure 1:
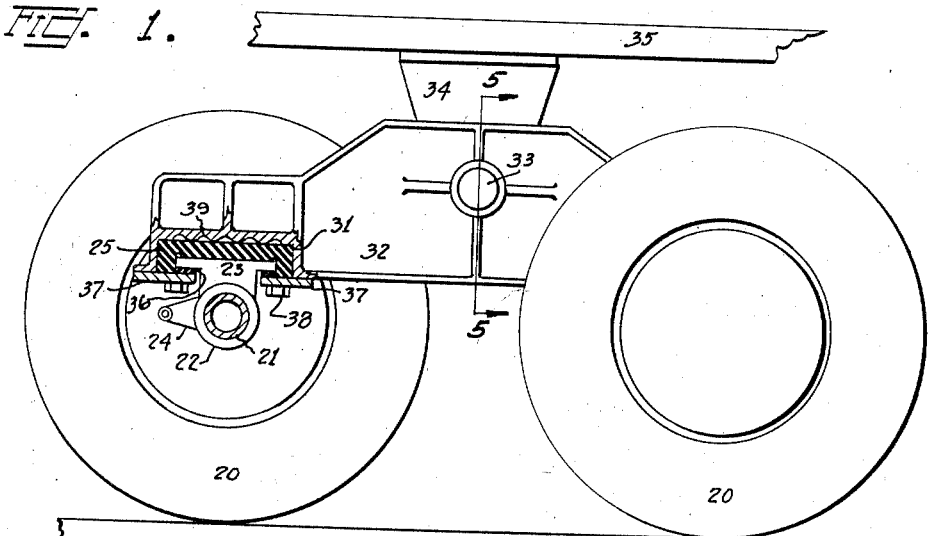
Fig. 1 is a fragmentary side elevation of the trailer with one of the axles broken away in vertical section through a cushion seat.
Figure 2:
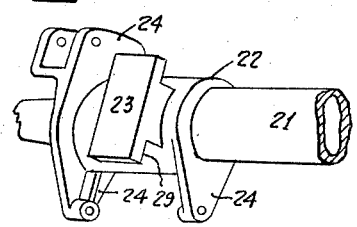
Fig. 2 is a fragmentary perspective view of one of the cushion tables showing same in position upon a brake spider casting.
Figure 3:
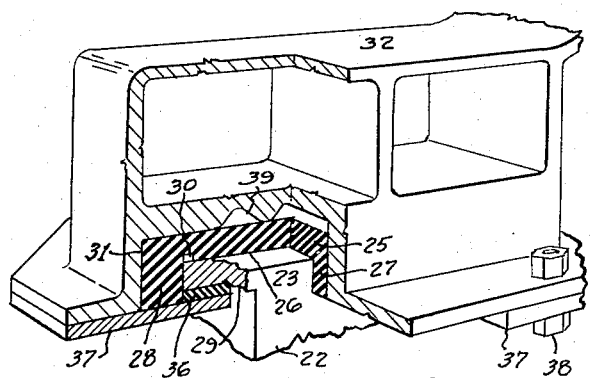
Fig. 3 is a fragmentary perspective view of the rocker frame with parts broken away in section to disclose the cushion.
Figure 4:
Fig. 4 is a perspective view of one of the rubber inserts.
Figure 5:
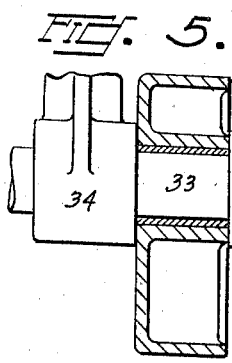
Fig. 5 is a fragmentary section taken along the line 5—5 in Fig. 1.
Figure 6:
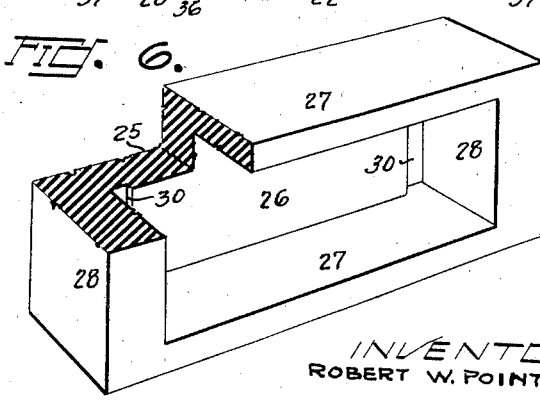
Fig. 6 is a perspective view of one of the rubber cushions with a portion broken away in section.

Referring in detail to Figs. 1 to 7 of the drawings, there is shown the ground engaging wheels 20 which are mounted on the axles 21. At each end of each axle 21 is mounted a brake spider casting 22 on which is secured a cushion table 23 which is in the form of a T standing upright in a plane normal to the axis of the axle 21. The brake spider casting 22 and its various arms 24 are described in my co-pending application Serial No. 232,955, filed Oct. 3, 1938.

Mounted on each table 23 is a boxlike rubber cushion 25 whose top 26 engages the table 23 while its sides 27 and 28 surround the table 23 and extend somewhat below the undersides 29 of the table 23. The top 26 is provided with transverse channels 30.

Each cushion 25 occupies a recess 31 in the rocker frame 32 which is pivotally mounted on the bolts 33 which are carried by the standards 34 which in turn support the trailer chassis frame 35. A rubber block 36 is placed against each of the undersides 29 of each table 23.

Clamping plates 37 are secured to the rocker frame 32 by means of the bolts 38 and hold the blocks 36 securely against the table bottoms 29.

It is desirable to provide corrugations 39 within the top of the recess 31 to permit the flow of the rubber when the cushion 25 is under compression.

It can be seen from the foregoing that when a trailer is thus mounted that vibrations and stresses which are ordinarily set up by the operating conditions of the trailer are absorbed or reduced to a degree which will not impair the life or utility of the trailer itself.

In the form of the device shown in Figs. 8 to 12, inclusive, there is illustrated a chassis frame 40 under each side 41 of which is mounted the brake spider 42 within which is secured a short axle 43 on each end of which is mounted a wheel 44.

In this form of the device there is illustrated a cushion table 45 in which are formed the channels 46 which permit the flow of the rubber cushion 25 when the trailer is loaded. The cushion table 45 is provided with transverse flanges 47 at its outermost ends which occupy the channels 30 in the cushion 25.

The working principle of both of the forms of the device is identical and the arrangement shown in either form of the device renders unnecessary the use of springs or other contrivances for the purpose of protecting the unit against vibration and objectionable stresses.

I claim:

1. In a device of the class described, the combination of an axle having a ground engaging wheel at each end thereof, a brake spider near each outer end of each axle on the inner side of its respective wheel, a cushion table secured to each spider, a rubber cushion attached to said table, said table and cushion having air tight pockets formed between their load supporting faces, a cushion housing within which said cushion is confined, a rocker frame of which said housing forms a part and means for pivotally attaching said rocker frame to a load supporting member.

2. In combination with a vehicle wheel carrying axle, a bearing member mounted on said axle and having a T-shaped projection on said bearing member having a load bearing surface, a housing mounted on said vehicle and having a load bearing surface, said housing having an opening in its lower face adapted to receive said projection, a resilient cushioning member, open only at its lower face, mounted in said housing and substantially enclosing said first mentioned load bearing surface, a recess formed in one of said load bearing surfaces whereby said resilient means is adapted to flow under stress into said recess, a separate cushioning member disposed beneath each end portion of said projection, and means detachably secured to said vehicle for removably securing said T-shaped projection and resilient cushioning members in said housing.

ROBERT W. POINTER.